United States Patent
Cui et al.

(10) Patent No.: US 12,151,710 B2
(45) Date of Patent: Nov. 26, 2024

(54) SYSTEM AND METHOD OF SPOOFING A PLANNING STACK OF AN AUTONOMOUS VEHICLE

(71) Applicant: GM CRUISE HOLDINGS LLC, San Francisco, CA (US)

(72) Inventors: Can Cui, San Francisco, CA (US); Vigneshram Krishnamoorthy, San Francisco, CA (US); Sasanka Nagavalli, Cupertino, CA (US); Nenad Uzunovic, San Carlos, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 562 days.

(21) Appl. No.: 17/562,918

(22) Filed: Dec. 27, 2021

(65) Prior Publication Data

US 2023/0202522 A1    Jun. 29, 2023

(51) Int. Cl.
*B60W 60/00* (2020.01)

(52) U.S. Cl.
CPC ..... *B60W 60/0015* (2020.02); *B60W 2554/20* (2020.02); *B60W 2554/402* (2020.02); *B60W 2556/00* (2020.02)

(58) Field of Classification Search
CPC ........ B60W 60/0015; B60W 2554/20; B60W 2554/402; B60W 2556/00
See application file for complete search history.

(56) References Cited

U.S. PATENT DOCUMENTS

| | | | |
|---|---|---|---|
| 10,019,011 B1 | 7/2018 | Green et al. | |
| 11,377,120 B1 | 7/2022 | Eric et al. | |
| 11,433,885 B1 | 9/2022 | Beller | |
| 2020/0302196 A1 | 9/2020 | Wellington et al. | |
| 2021/0053570 A1 | 2/2021 | Akella et al. | |
| 2021/0133466 A1 | 5/2021 | Gier et al. | |
| 2021/0291863 A1 | 9/2021 | Tao et al. | |
| 2021/0300412 A1 | 9/2021 | Dingli et al. | |
| 2022/0105959 A1 | 4/2022 | Hartnett et al. | |
| 2022/0250641 A1 | 8/2022 | Seegmiller et al. | |

*Primary Examiner* — Mathew Franklin Gordon
(74) *Attorney, Agent, or Firm* — Michael DiCato

(57) ABSTRACT

Disclosed herein are systems and method including a method for managing an autonomous vehicle. The method includes obtaining labels associated with various aspects of right-of-way interactions between an autonomous vehicle and an agent, wherein the right-of-way interactions occur when a human driver takes over for the autonomous vehicle and performs the right-of-way interactions, running an autonomous vehicle stack that is untrained for processing right-of-way interactions between the autonomous vehicle and the agent, injecting the labels into the autonomous vehicle stack and determining, based on the injecting of the labels into the autonomous vehicle stack, a performance of the autonomous vehicle stack.

19 Claims, 15 Drawing Sheets

SYSTEM AND METHOD OF SPOOFING A PLANNING STACK OF AN AUTONOMOUS VEHICLE

FIELD OF THE DISCLOSURE

The present disclosure relates to autonomous vehicles (AVs) and furthermore to a process of spoofing a planning stack with auto-generated yield/assert labels obtained by running an AV and recording and labeling yield/assert decisions by the AV or a human driver overtaking the AV decisions.

INTRODUCTION

Autonomous vehicles (AVs) at least to some degree are starting to appear in our economy. In some cases, an AV includes sensors that enable it to determine whether other vehicles or objects are in its way. A control system on the AV will utilize the data from the sensors and avoid the objects which can prevent collisions. However, simply avoiding objects may not provide a sufficient amount of safety when using an AV. There are many decisions which are made which go beyond simply avoiding accidents.

BRIEF DESCRIPTION OF THE FIGURES

Illustrative embodiments of the present application are described in detail below with reference to the following figures.

DETAILED DESCRIPTION

Figure 1:
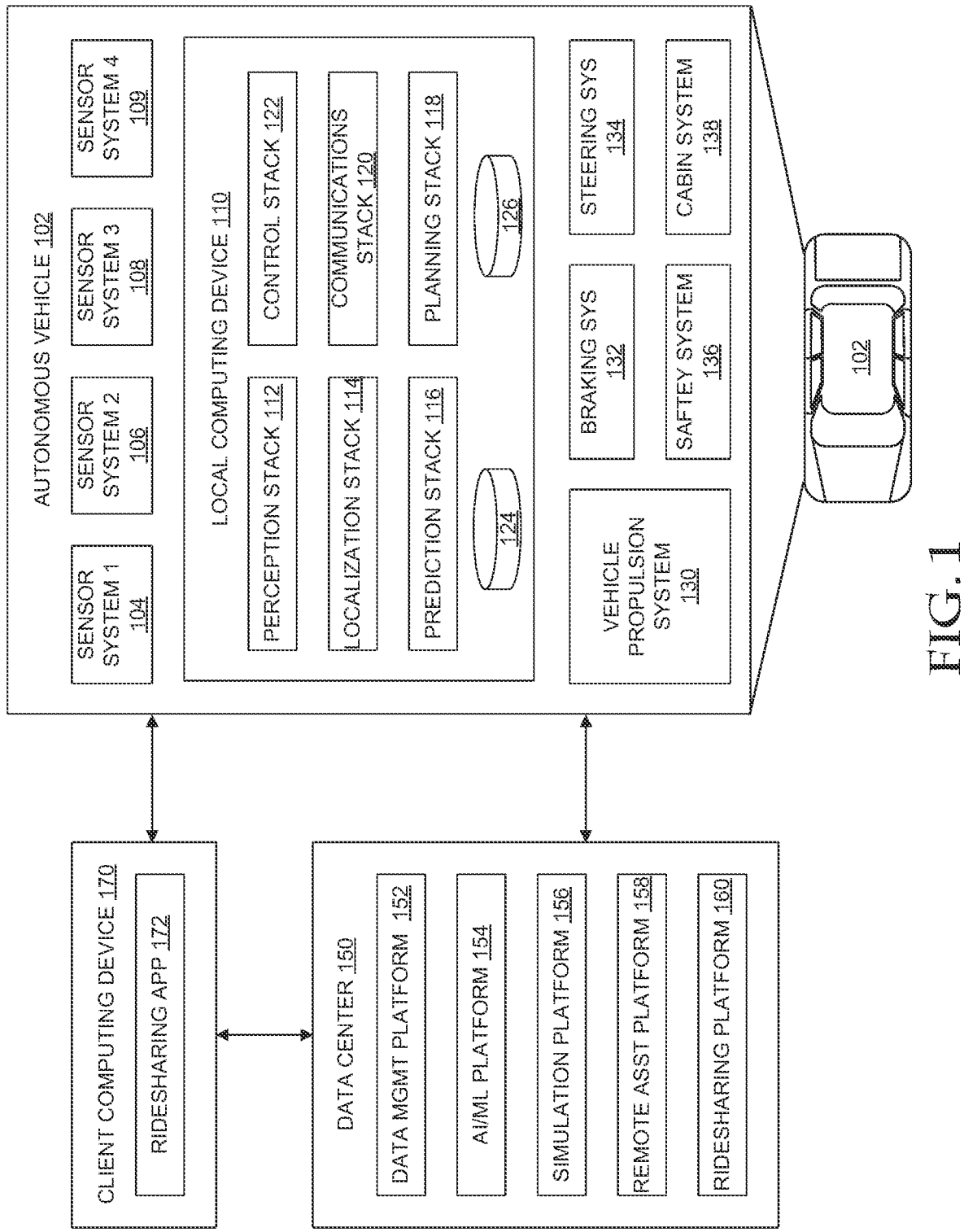
FIG. 1 illustrates an example of a system for managing one or more Autonomous Vehicles (AVs) in accordance with some aspects of the present technology.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

BRIEF SUMMARY OF THE DISCLOSURE

This disclosure focuses on three aspects of improving how an autonomous vehicle (AV) will not only avoid obstacles but how the AV can improve in its interactions with other vehicles or entities that it may encounter. These various entities can be called agents or non-player characters (NPCs) which is a name borrowed from the gaming industry. The three disclosed ideas include (1) how to gather data to use for training and evaluating a machine learning model to classify given a certain situation whether the AV could assert itself against another entity or whether to yield to the other entity; (2) how to use a trained machine learning model to decide whether to assert or to yield; and (3) how to use labels obtained from on-road experiences with an AV to spoof a planning stack of the AV and determine, based on the outcome, the viability of the structure of the labels with respect to whether to yield/assert or perform some other action relative to another entity.

Learning from On-Road AV Experience

The first aspect of this disclosure relates to learning from on-road experience. Specifically, a human user may be sitting in an AV and certain decisions will need to be made with respect to whether to yield to another car or person, assert or overtake the other entity or encroach on the other entity's path. A method in this regard can include running an autonomous vehicle that performs right-of-way movements relative to agents, recording, for a plurality of segments of time or distance, where the autonomous vehicle and where the agents are for each tick in each of the plurality of segments, running an autolabeler module on a segment of the plurality of segments to calculate a respective value for each of a plurality of right-of-way labels and using the plurality of right-of-way labels to perform one or more of spoofing an autonomous vehicle stack or to train a right-of-way machine learning model.

The autolabeler module can calculate the respective value for a plurality of right-of-way labels on a per tick basis. The running of the autolabeler module on the segment of time or distance of the plurality of segments to calculate the respective value for each of the plurality of right-of-way labels further can include the looking, via the autolabeler module, into the future for an outcome based on positions for the autonomous vehicle relative to a respective agent. Looking, via the autolabeler module, into the future for an outcome of positions for the autonomous vehicle relative to a respective agent can be performed on a per tick basis in the segment. Otherwise, the timing or structure of when the autolabeler module operates can vary such as every one-half second or the like.

The right-of-way movements relative to the agents can be performed one of autonomously or via human intervention. As noted above, a human driver can be involved in controlling the autonomous vehicle that performs the right-of-way movements relative to the agents and the process can further include the human driver correcting actions of the autonomous vehicle with respect to the right-of-way movements.

Another method embodiment of this first concept disclosed herein can include receiving, at an autolabeler module, data regarding on-road movements of an autonomous vehicle relative to surrounding agents, calculating, via the autolabeler module, a value for each of a plurality of right-of-way labels based on the on-road movements of the autonomous vehicle and performing one of training a machine learning model based on the plurality of right-of-way labels or spoofing an autonomous vehicle stack based on the plurality of right-of-way labels. This approach is defined from the standpoint of the autolabeler module.

The plurality of right-of-way labels can include one or more of yield/assert, overtake/don't overtake and encroach/don't encroach. Other labels can also be provided such as a speed at which to yield/assert, how aggressive to be, and so forth. Thus, the labels can be more refined than just a yield or assert label. Other sublabels or more granularity can be used to define the interactions between the AV and an agent or a plurality of agents.

A system embodiment can include a processor and a computer-readable storage medium storing instructions which, when executed by the processor, cause the processor to perform operations including receiving data regarding on-road movements of an autonomous vehicle relative to surrounding agents, calculating a value for each of a plurality of right-of-way labels based on the on-road movements of the autonomous vehicle and performing one of training a machine learning model based on the plurality of right-of-way labels or spoofing an autonomous vehicle stack based on the plurality of right-of-way labels. The system can also be defined as being configured to perform any method disclosed herein.

Using the Machine-Learning Model to Make Yield/Assert Decisions

The next concept relates to how to use the trained machine learning model in an AV to make yield/assert decisions with respect to one or more agents in the vicinity of the AV. A method includes in this respect evaluating a plurality of agents in a vicinity of an autonomous vehicle to yield an evaluation, determining a planned travel path for the autonomous vehicle, based on the evaluation and the planned travel path, determining whether to yield or to assert with respect to each respective agent of the plurality of agents to yield a plurality of yield/assert predictions and causing the autonomous vehicle to travel along the planned travel path while yielding or asserting against the plurality of agents according to the plurality of yield/assert predictions. The determining step can be performed via a machine learning model that incorporates a context of a scene comprising the autonomous vehicle and the plurality of agents. Each respective agent of the plurality of agents can include one of a vehicle, a person, a bicycle, a motorcycle, or other moving object. The context of the scene can include one or more of a current state of the autonomous vehicle, a traffic light state, a lane state, and a predicted action associated with each respective agent of the plurality of agents. The current state of the autonomous vehicle can include one or more of a position of the autonomous vehicle, an acceleration of the autonomous vehicle, a velocity of the autonomous vehicle, characteristics associated with the autonomous vehicle, a predicted future pose of the autonomous vehicle, and a prediction of future motion of the autonomous vehicle. The system can make a prediction conditioned on the predicted future intent or trajectory of the AV.

In another aspect, data for the context of the scene can be provided at least in part to the machine learning model via one or more of a raster image, a vector and a vector of scalars. The plurality of yield/assert predictions can include a set of yield/assert predictions in which a respective yield/assert prediction is included for each respective agent of the plurality of agents.

A plurality of different types of input related to the context of the scene can be provided in one aspect as input to the machine learning model, and wherein an output of the machine learning model can include the plurality of yield/assert predictions.

The step of causing the autonomous vehicle to travel along the planned travel path while yielding or asserting against the plurality of agents according to the plurality of yield/assert predictions further can include implementing, in each potential branch associated with a respective possible travel path of the autonomous vehicle being evaluated by a planner module, a respective cost relative to the each respective prediction of the plurality of yield/assert predictions for each respective agent of the plurality of agents.

In another aspect, implementing the respective cost can further include, for each potential branch of the respective possible travel path of the autonomous vehicle, one or more of: adding no cost for a far head agent in front of the autonomous vehicle that the AV does not overtake, adding no cost for an agent behind the autonomous vehicle, adding no cost for a laterally distant agent, adding no cost for an agent which the autonomous vehicle should assert over, adding no cost for the autonomous vehicle to branch around an agent to which the autonomous vehicle is not requested to yield, and adding a cost to pass a longitudinally and laterally nearby agent ahead of the autonomous vehicle.

A system embodiment can include a processor and a computer-readable storage device storing instructions which, when executed by the processor, cause the processor to perform operations including evaluating a plurality of agents in a vicinity of an autonomous vehicle to yield an evaluation, determining a planned travel path for the autonomous vehicle, based on the evaluation and the planned travel path, determining whether to yield or to assert with respect to each respective agent of the plurality of agents to yield a plurality of yield/assert predictions and causing the autonomous vehicle to travel along the planned travel path while yielding or asserting against the plurality of agents according to the plurality of yield/assert predictions.

Another method embodiment can include providing as first input to a machine learning model a raster image and/or a vector associated with a context of a scene including an autonomous vehicle and a plurality of agents, providing as second input to the machine learning model a planned travel path for the autonomous vehicle, based the first input and the second input, outputting from the machine learning model a plurality of yield/assert predictions, wherein the plurality of yield/assert predictions comprises a respective yield/assert prediction related to whether to yield or to assert in relation to each respective agent of the plurality of agents and causing the autonomous vehicle to travel along the planned travel path while yielding or asserting against the plurality of agents according to the plurality of yield/assert predictions.

Spoofing a Planning Stack with On-Road Auto-Generated Labels

The third aspect of this disclosure involves testing how good the label definitions are by inserting the labels obtained from on-road testing using an actual AV and in comes cases a human driver to make yield/assert decisions into a planning stack of the AV. The method includes using the auto-labeler to generate the labels associated with those decisions and then inserting those labels into the planning stack of the AV to see what outcomes occur in an end-to-end simulation of the road event. The outcome can provide intelligence on how well the labels are defined.

A method in this regard includes obtaining labels associated with various aspects of right-of-way interactions between an autonomous vehicle and an agent, wherein the right-of-way interactions occur when a human driver takes over for the autonomous vehicle and performs the right-of-way interactions, running an autonomous vehicle stack that is untrained for processing right-of-way interactions between the autonomous vehicle and the agent, injecting the labels into the autonomous vehicle stack and determining, based on the injecting of the labels into the autonomous vehicle stack, a performance of the autonomous vehicle stack. The labels can include at least a first label associated with asserting against the agent and a second label associated with yielding to the agent. The labels further can include a plurality of labels associated with different types of agents.

The agents can include at least one of more of vehicles, bicycles, motorcycles, pedestrians, and any moving actors. The step of determining, based on the injecting of the labels into the autonomous vehicle stack, the performance of the autonomous vehicle stack without training a machine learning model on the labels further can include determining an upper bound on a positive impact that can be obtained from the autonomous vehicle stack given a current formulation of the labels. The step of determining, based on the injecting of the labels into the autonomous vehicle stack, the performance of the autonomous vehicle stack further can include adjusting a path of the autonomous vehicle based on an outcome of the autonomous vehicle stack. The autonomous vehicle stack can include a planning stack plus other stacks used for other operations.

The method can further include, based on the performance of the autonomous vehicle stack, adjusting a formulation of the labels to yield new improved labels.

In another aspect, the method can include injecting the new labels into the autonomous vehicle stack and determining, based on the injecting of the new labels into the autonomous vehicle stack, a second performance of the autonomous vehicle stack. The labels can be associated with ticks within segments of data gathered by the autonomous vehicle. In one aspect, the labels can include one or more of overtake/don't overtake, encroach/don't encroach and yield/assert.

A system aspect of this disclosure can include an autonomous vehicle that drives at least in part without human intervention, an automatic labeler that receives data regarding right-of-way decisions made by a human driver correcting decisions made by the autonomous vehicle and outputs right-of-way labels, and a planning stack associated with deciding how to navigate the autonomous vehicle, wherein the right-of-way labels are injected into the planning stack to generate a planning stack output based on the right-of-way labels. The planning stack output can cause the autonomous vehicle to take an action related to a right-of-way decision with respect to one or more agents.

The system can further include a machine learning model trained on the right-of-way labels as well as an autonomous vehicle stack that incorporates the machine learning model for making right-of-way predictions contextually.

DETAILED DESCRIPTION OF THE DISCLOSURE

The present disclosure addresses the problem with respect to the number of occurrences which an autonomous vehicle might be stopped behind various objects within its environment. For example, there are a relatively large number of situations in which the AV comes up behind a slow-moving or stationary vehicle and does not make the appropriate move around the vehicle. In some situations, the AV might be stopped behind a slow or stationary bike or behind pedestrians. In other cases, the AV does not properly yield for pedestrians and is not properly yielding for bicycles.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an autonomous vehicle (AV) 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, 108 and 109. The sensor systems 104-109 can include different types of sensors and can be arranged about the AV 102. For instance, the sensor systems 104-109 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Sensor system 109 can be a different type of sensor such as a camera. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-109, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-109; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, RADAR, etc.), "hear" (e.g., via microphones, ultrasonic sensors, etc.), and "feel" (e.g., pressure sensors, force sensors, impact sensors, etc.) its environment using information from the sensor systems 104-109, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the perception stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-109 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

This disclosure refines the prediction stack 116 with a new model that can be used to predict whether the AV 102 should assert or yield to each respective agent in its vicinity or that it may interact with. The new model may be implemented on the AV 102 or in connection with an AI/ML platform 154 or both.

The planning stack 118 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

This disclosure further refines the planning stack 118 with respect to modifying how the cost analysis is done for each branch of a tree structure in which each branch represents a potential route that the AV 102 can take.

The control stack 122 can manage the operation of the vehicle propulsion system 130, the braking system 132, the steering system 134, the safety system 136, and the cabin system 138. The control stack 122 can receive sensor signals from the sensor systems 104-109 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-109, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-109, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2A:
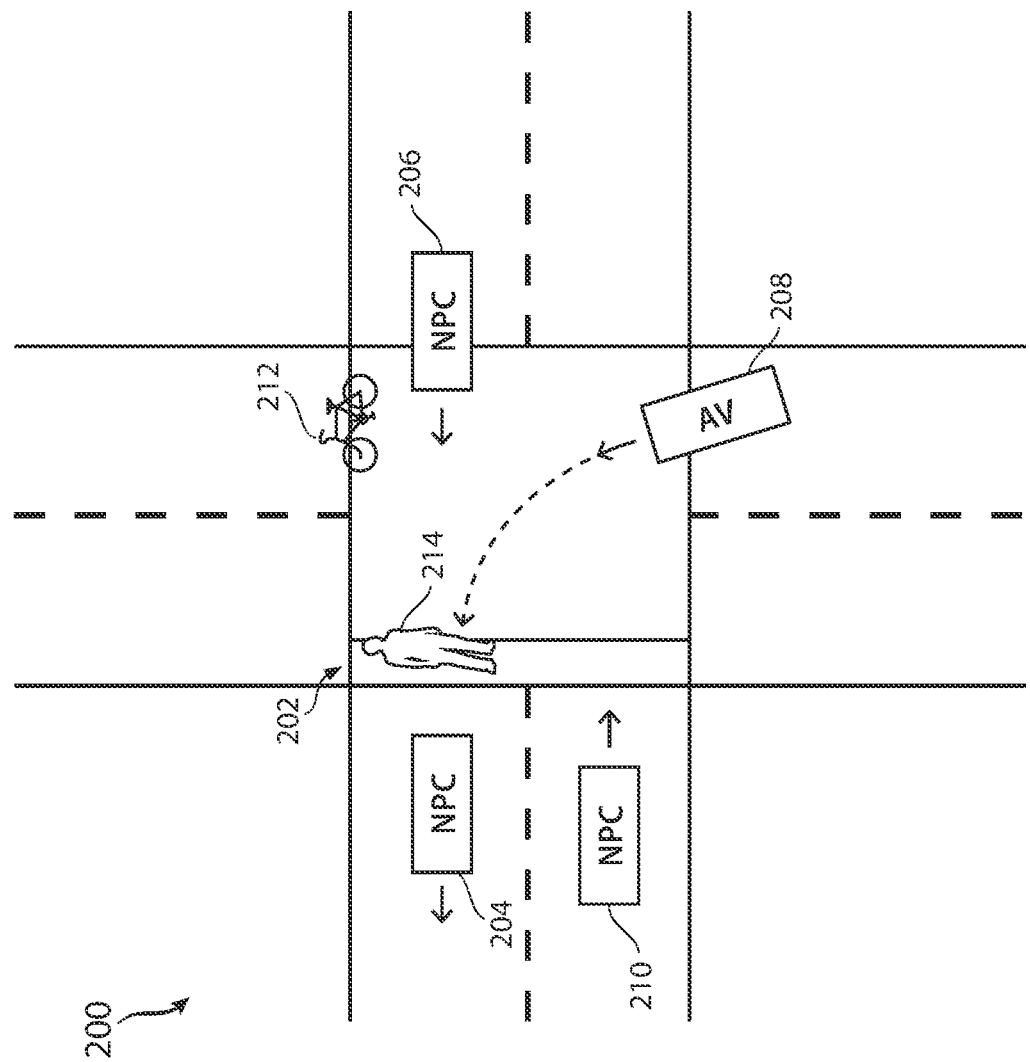
FIG. 2A illustrates a scene where an AV may or may not overtake an agent or other vehicle.

As noted above, this disclosure provides improvements to one or more of the components shown in FIG. 1. FIG. 2A illustrates an environment 200 that shows the need for the improvement with respect to how an AV 208 would interact with other agents or NPCs (non-player characters) 204, 206, 210, 214, 212 on a road 202. Agents shown include vehicles 204, 206, 210, a pedestrian 214 and a bicycle 212. Note that the terms "agent" and "NPC" are used interchangeably in this disclosure. They each represent a physical entity in the area around an AV 208 that it may interact with that it needs to be aware of to make right-of-way decisions or other types of decisions due to the presence of the agent/NPC.

These agents represent the different types of agents that can be evaluated as described herein. The issue that the present disclosure addresses is the determination of the AV 208 regarding whether to assert or to yield to any respective agent. Shown in the figure is the AV 208 asserting against the agent 206. As disclosed herein, the concept of asserting is that the AV 208 will speed up or take a lead position relative to the agent that is being asserted against. Thus, the question is whether the AV 208 will assert or yield against the various agents. Note that the pedestrian 214 is in the crosswalk. In this case, the AV 208 might decide to assert against the pedestrian 214 and thus speed up to get to the crosswalk before the pedestrian 214 or to yield and let the pedestrian 214 have the right-of-way. What is needed in the art is an improvement with respect to how the planning module/stack 118 will control the movement of the AV 208 with respect to asserting and yielding to the respective agents within the scene or the field of view.

In one aspect, the decision to assert or to overtake can be measured or decided by an AV and agent's longitudinal distance along the AV's reference or planned path. This can be characterized as one dimension of the labeling process with respect to when to overtake or assert and a label can be determined with respect to an AV-NPC pair. For a given parameter, the system can calculate the physical AV's future physical path and the label associated with that path might be "yield" if the target agent is within the AV's future physical path in the near future. The overtake can be measured by the AV and agent's longitudinal distance along the AV's reference path. This can take into account the agent trajectory, the agent yaw, and the AV trajectory with the right-of-way decision made. For a given time in a segment of time, the system can calculate the physical AV's future physical path and determine a value of a label such as yield or any other label if the target agent is within the AV's future physical path in the near future.

Another dimension or label might be an intent encroachment label which determines whether or not the AV should encroach on the region the agent intends to occupy in the future. This applies to situations where the AV has a trajectory which overlaps with an expected trajectory of the agent. Another interpretation is whether or not to engage in interaction with the agent. The system can look for conflict regions such as where the physical AV and the agent expected future paths overlap. The system can determine the first agent to arrive and propagate a label backwards in time to determine whether to set an intent encroachment label.

The system can use such factors in determining and applying the expanded use of labels beyond just yielding or not. For example, the system can use a trajectory of the agent and determine the AV trajectory with a right-of-way assert as the label. An AV trajectory with a right-of-way yield can include data about an agent being in a crosswalk or the existence of a crosswalk, a conflict region in which the AV is the winner, a conflict region in which the agent is the winner, an agent effective footprint, an agent yaw or rotation movement around a vertical axis. The framework for labels describes an extension of the scope of the labels to general costing of interactions and near-interactions as well. The extended use of labels can provide labeling for more detailed interactions beyond just asserting or yielding against an agent.

Note that the machine learning model can be trained in a number of different ways with appropriate labels. The model might be trained manually from an expert or other user manually labeling scenarios of when the AV 108 should assert or yield to a given agent. In another aspect, the autolabeler system can automatically provide labels to the model when an AV is driving around and a human operator is capable of stepping in and taking over the control of the AV when it is appropriate to assert or to yield to an agent. For example, an AV 108 might be stuck behind a slow-moving vehicle such as a bus and not take the autonomous initiative to overtake or assert against the bus. The human driver might take over and overtake or assert against the bus and moving in front of it. In many situations, the AV 108 might make mistakes in how it decides whether to assert or yield and every human correction or right behavior will cause the machine learning model to "learn" or improve by the on-road experience. That data can be used to label or train the machine learning model with respect to whether to assert or yield against an agent. Many different scenarios can be provided in interactions with agents in which the human driver decisions can automatically be translated or provided to train the machine learning model described herein.

In one example, the machine learning model can be trained on mined buckets of data such as AV-agent interactions mined explicitly such as through on-road actual movements of the AV relative to agents. Custom buckets can be created as well on model error modes to improve the training. The feature space can include a semantic bitmap, lane features, AV and agent kinematics, an AV intent bitmap and an agent occupancy movie or prediction of the future motion of the agent.

Figure 2B:
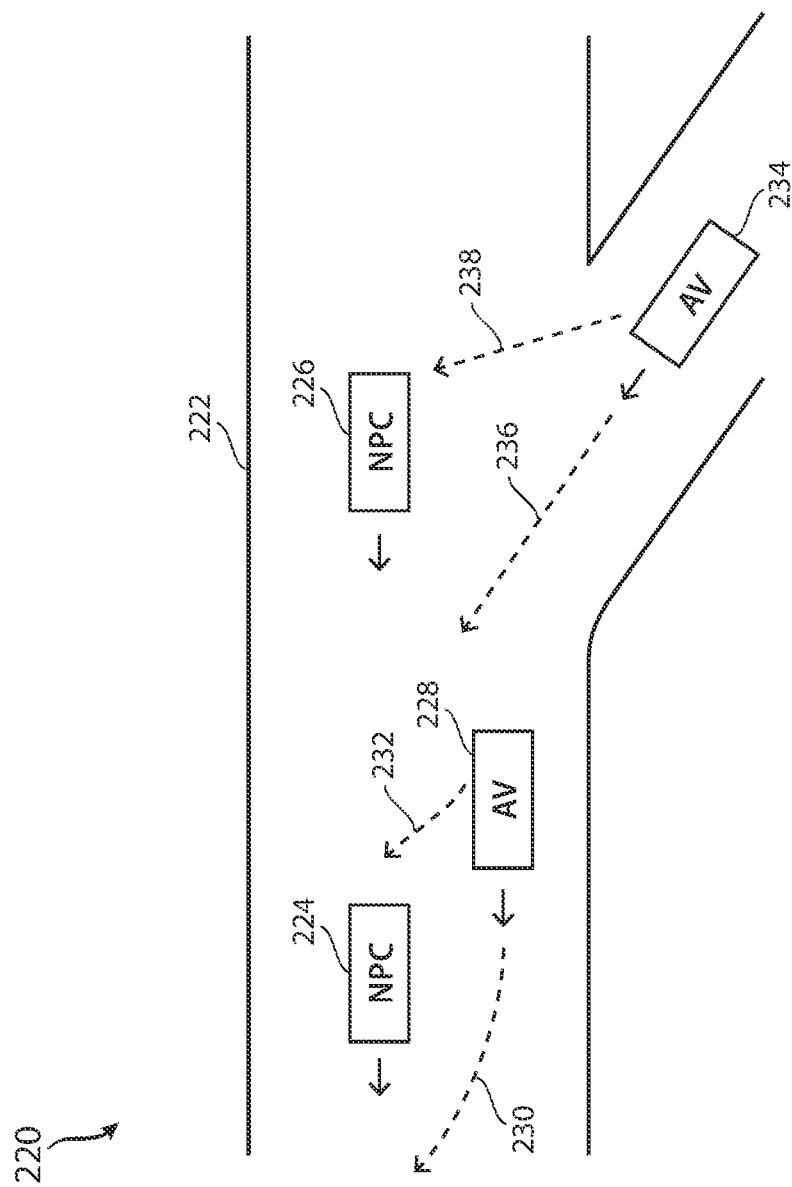
FIG. 2B illustrates a scene where the AV may or may not overtake an agent or other vehicle.

FIG. 2B illustrates another example scene 220 in which an AV 234 is coming into a road 222 from an angled street. Two agents 234, 226 are in the road already. The AV 234 can take path 236 and assert against the agent 226. Alternatively, the AV 234 could take path 238 and yield against the agent 226. In another example, another AV 228 could take path 230 and speed past the agent 224 in an assertion operation. Otherwise, the AV 228 could yield to agent 224 and follow path 232 to coming behind the agent 224.

Note that the motivation behind this disclosure is to improve the decision-making process of a route for an AV 102 beyond just a legal "right-of-way" rule. This decision requires human-like reasoning and is difficult to capture with heuristics. In some cases, predictions do not necessarily indicate where an AV 102 can or cannot assert against an agent. In other cases, the AV 102 should yield to an agent even when the agent is not predicted to enter into the AV 102 path.

The approach disclosed herein includes an agent or NPC specific planning response and to determine whether to yield for each AV-NPC pair and for each AV intent in a self supervised fashion. The approach should be implemented on a per AV intent because the "right-of-way" can be dependent upon both the agent's intent and the AV intent. There can also be multiple notions of what it means to yield or to assert. For example, the question might be whether the AV should overtake an agent, or whether it should cut in in front of an agent. The system may need to participate in lateral biasing in making these decisions. Furthermore, the approach should be self-supervised such that data can be labeled using on-road outcomes.

Figure 3:
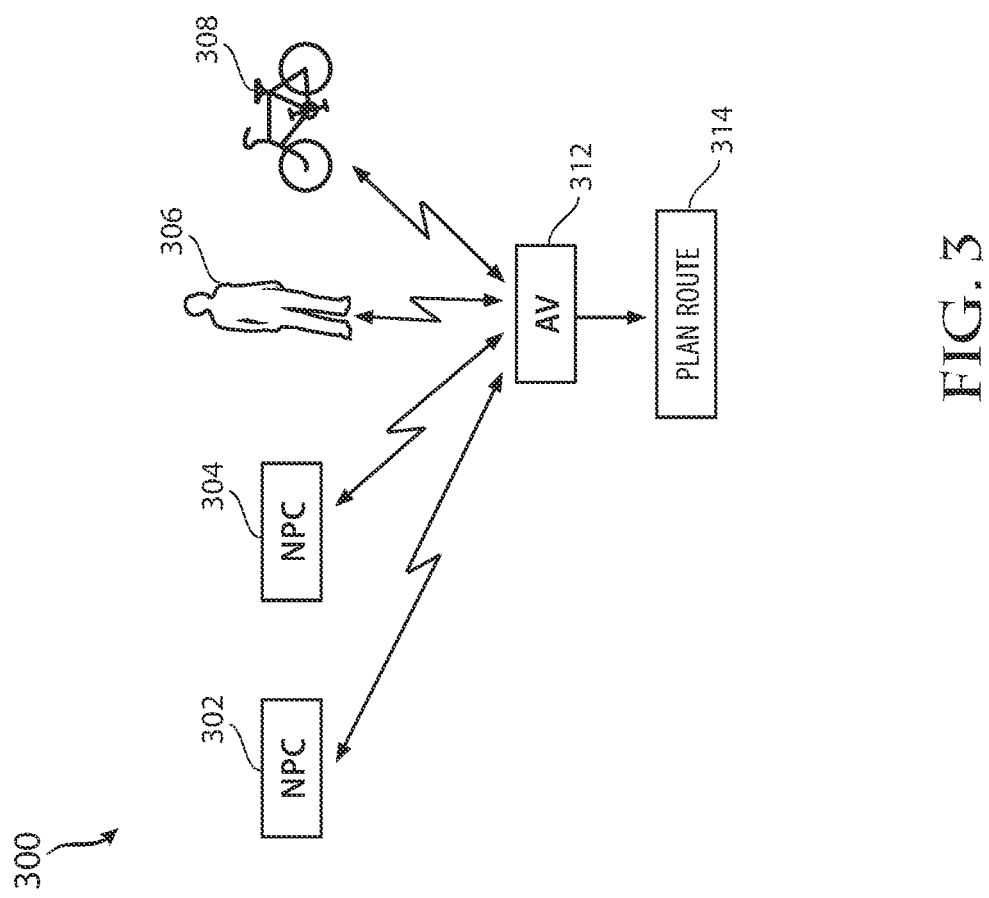
FIG. 3 illustrates the AV receiving various types of data from various sensors and planning a route based on that data.

FIG. 3 illustrates an example framework 300 which includes agents 302, 304 as vehicles, a pedestrian 306, and a bicycle 308. The various sensors disclosed with respect to the AV 312 can be used to sense or receive data regarding the characteristics of each of these agents. The AV 312 can include a model as part of its predictions stack 116 that can utilize the various and different types of data as inputs to a machine learning model which can output an assert or yield prediction or classification. The predictions can be interpreted as labels in the planning stack. For example, the assert option can be characterized as an overtaken label in which the AV is to overtake an agent. Another label can be an intent encroachment label in which the AV intends to encroach on or to yield to the agent. These can be combined and interpreted as a single overtake label such as an "avShouldYield" label. In one aspect, the output could be a probability between zero and one that the AV should yield to the respective agent. In another aspect, the output can be a zero meaning the AV should not yield to the respective agent for the output can be a one meaning that the AV should yield to the respective agent. The output of a respective avShouldYield label for a respective agent can be provided to a planning stack 118 as a plan route component 314 in FIG. 3.

The yield or assert decision can also be done with respect to lead cars or the bikes within a certain scenario, crosswalk pedestrians and jaywalking people. Note that the above description covers a simple yield/assert label whereas the disclosure envisions also more labels and definitions than just a binary classification of yield or assert.

The labels can be obtained in a number of different ways. There are supervised and unsupervised approaches to machine-learning model training. In one aspect, obtaining the labels for the machine learning model can come from on-road outcomes. A driver can be in an AV 108 letting it perform autonomous driving. In some cases, the human driver may take over for a moment and do the driving where necessary. In the scenario of determining whether to assert or yield, one way to label is to record data regarding when a driver will step in and manually assert or yield to an agent. In other words, what happens on the road can be used to generate the labels for the machine-learning model. The system can be set up where, for example, the AV might be driving for 8 hours with some amount of like manual driving as well. As the human driver makes decisions regarding asserting or yielding to agents, the AV 108 is sensing and evaluating those other agents such that the manual data (when the human takes over) can be used to automatically label what happened on the road. Thus, the model is learning from on-road outcomes in an auto-labeled way.

Figure 4:
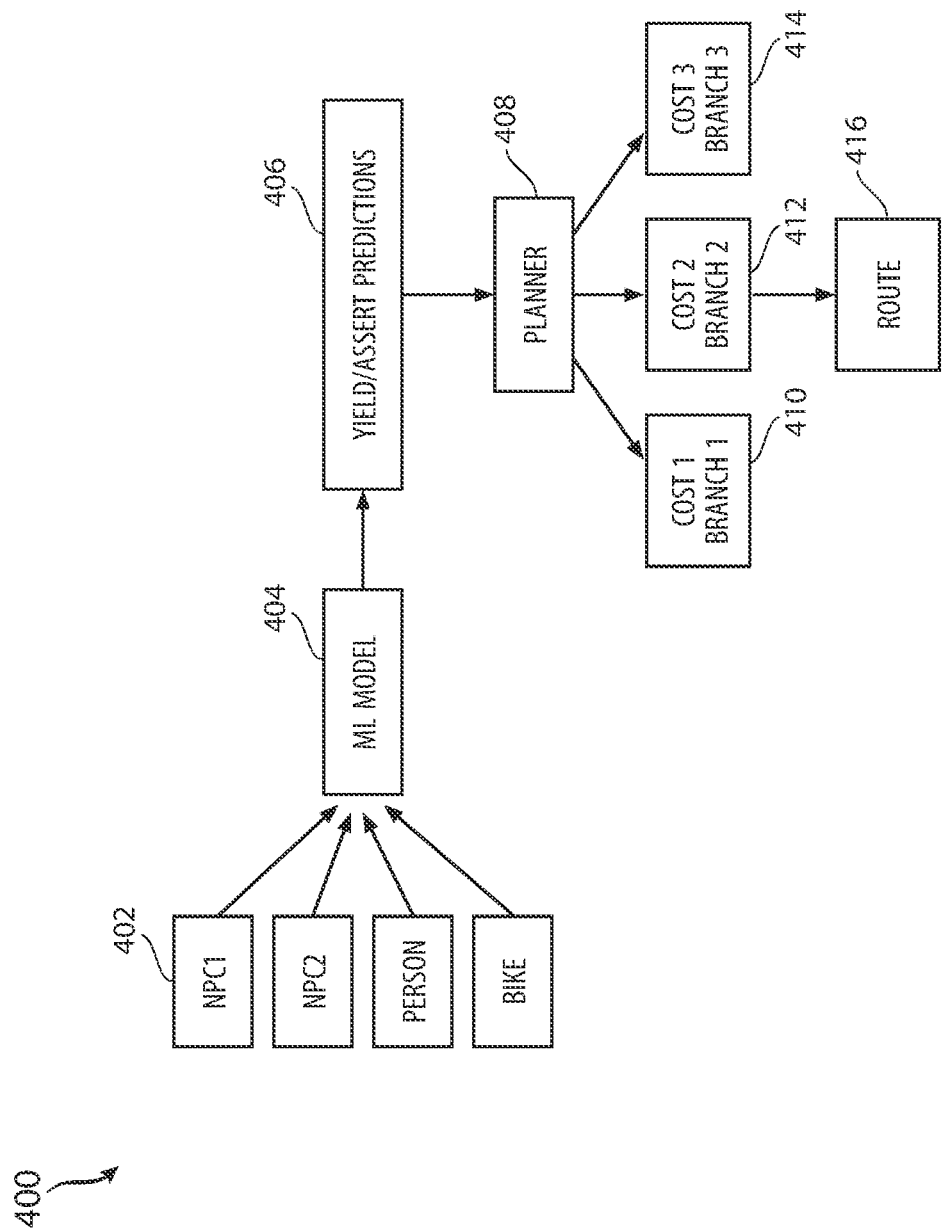
FIG. 4 illustrates a machine learning model receiving various types of data and outputting yield/assert predictions which are then provided to a planner module for use in evaluating costs of various branches or potential routes for the AV.

FIG. 4 illustrates the process 400 in more detail. As shown in this figure, the various types of input 402 are provided to the machine learning model 404. As noted herein, the type of data which can be provided can vary and can include images in a raster format or vectors having any type of data such as vectors having scalar data. The machine learning model output a respective yield/assert prediction 406 which output is provided to the planner 408. The planner will continuously evaluate what route or path the AV should take and may be evaluating a number of different branches before determining for any given instance which branch should be used for the path of the AV. The process disclosed herein utilizes the yield/assert predictions as part of a cost analysis of each branch. For example, the planner 408 may establish a first cost for a first branch as shown in operation 410. A second cost of the second branch is shown as operation 412. A third cost of the third branch is shown in operation 414. While a number of different factors are included in the cost analysis besides just the yield/assert predictions, this disclosure requires at least the yield/assert predictions to be used as part of the final cost analysis. For example, the cost analysis might include a prediction of a collision with an object based on a certain branch if a certain route was to be taken by the AV. Other factors such as speed, characteristics of the agents, and so forth can be taken into account when evaluating the cost. However, this disclosure includes or requires that at least the yield/assertion (or other granular label) predictions are used to determine the cost in each branch.

In FIG. 4, assume that the second cost of the second branch in operation 412 has the lowest relative cost to the other branches. Then, that branch or the route associated with that branch would used for the route of the AV 416.

Figure 5A:
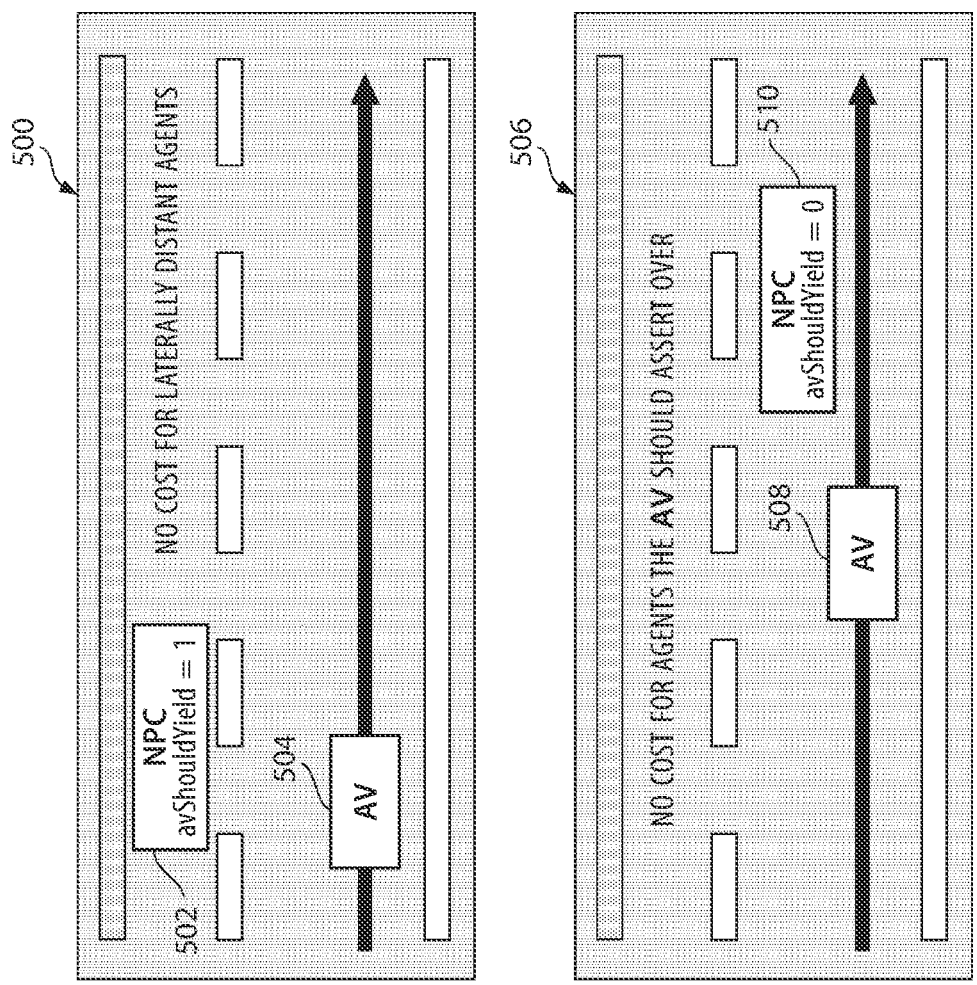
FIGS. 5A-5C illustrate various ways of calculating costs associated with asserting or yielding to agents.

FIG. 5A Illustrates how the costs might be calculated with respect to yielding and asserting by the AV. FIG. 5A shows graphically 500 how no cost will be provided for a laterally distant agent 502 relative to the AV 504. Laterally distant in this case can be a distance considered in the context of vehicles on a road together but where the agent 502 is sufficiently far away from the AV 504 that, in one example, there simply needs to be no decision regarding whether to yield or to assert as that agent is simply too far to the side or laterally to the AV 504. For example, the agent 502 might be two lanes away from the AV 504. In another example, the avShouldYield value might be 1 which means that the output indicates a high probability that the AV 504 should yield to the agent 502 but that there should be no cost with respect to that potential route. Road 506 shows an AV 508 and agent 510 in which the avShouldYield score is 0 meaning that the AV 508 should assert relative to the agent 510 and where there should be no right of way cost in this case. As can be seen, the agent 510 is simply ahead into the left of the AV 508 and so asserting against that agent should be straightforward and not dangerous.

Figure 5B:
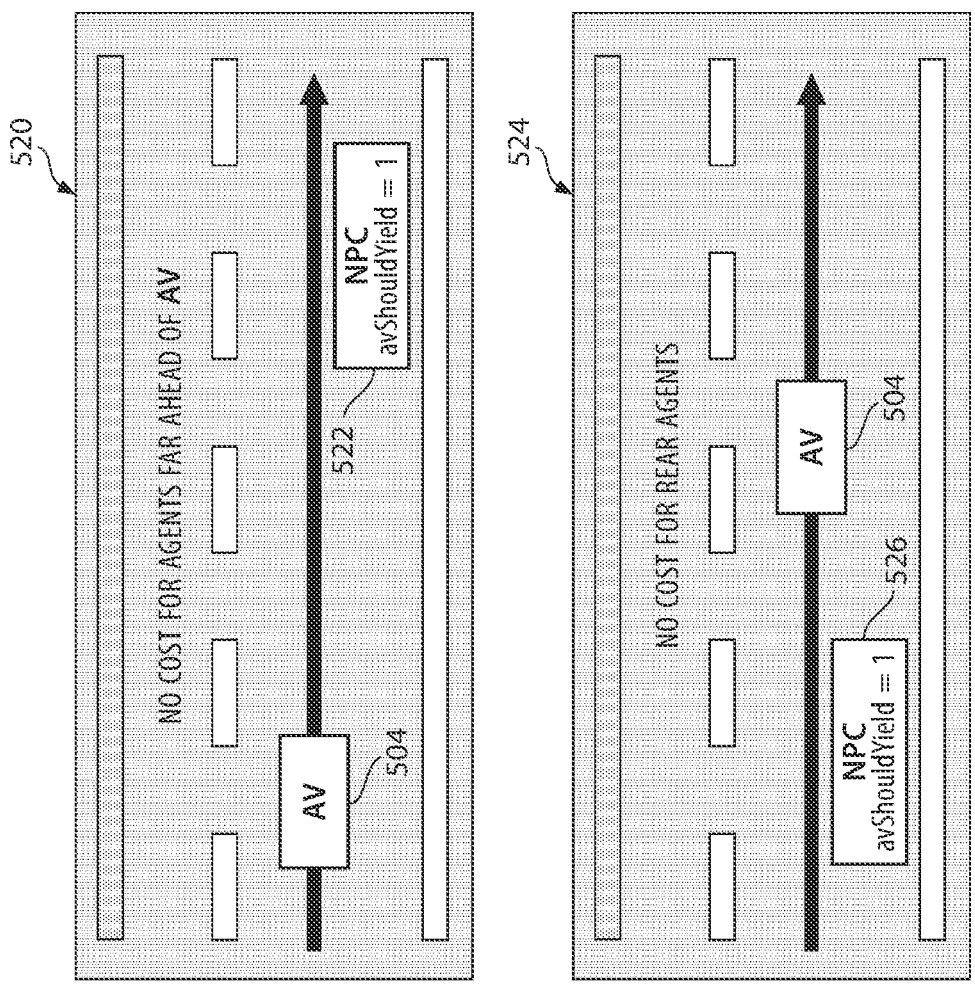
Figure 5C:
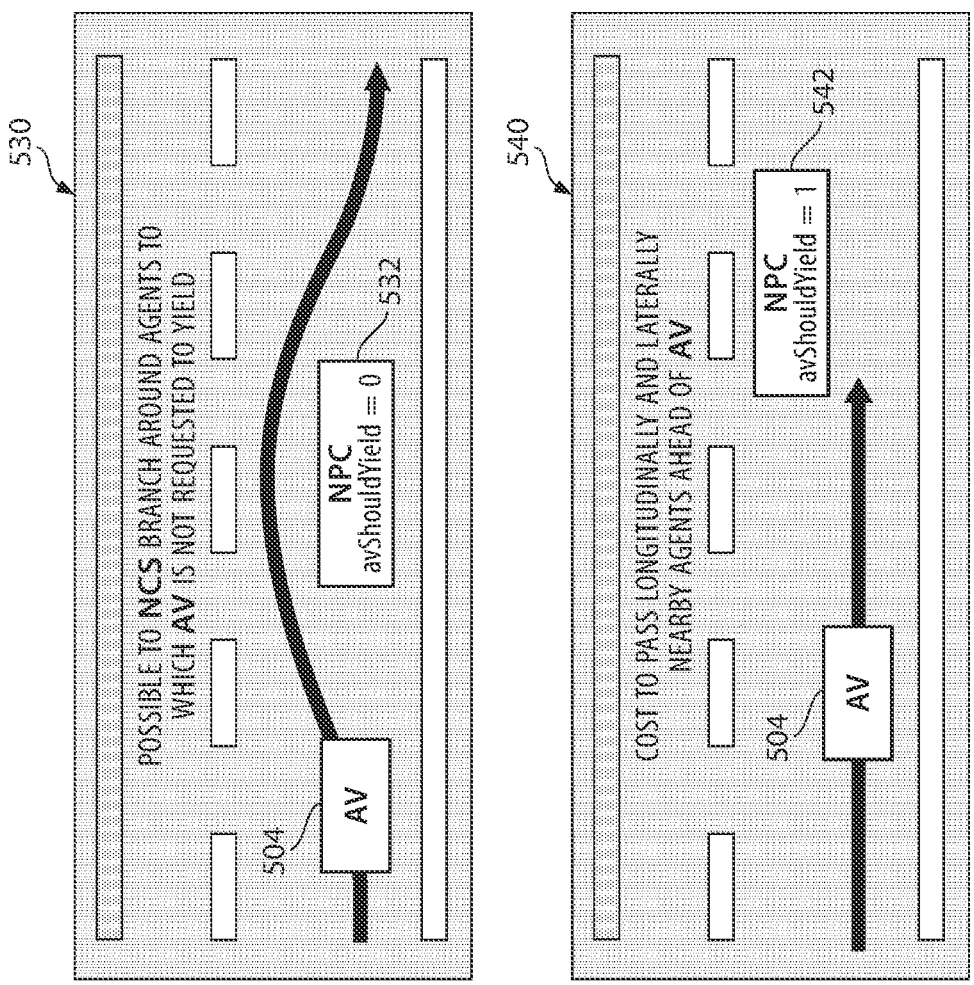

FIG. 5B illustrates a scenario 520 and which there are no cost for agents 522 far head of an the AV 504. The avShouldYield value is 1 in that the AV 504 is going to yield against the agent 522. Furthermore, despite the avShouldYield=1 in this case, the branch does not accumulate a cost because the agent is still well ahead of the AV so the branch does not take the AV passed the agent. The scenario 524 shows that there should be no cost for agents 526 behind the AV 504. In this case, even if the avShouldYield prediction from the ML model is 1, which is incorrect, the planning stack won't incur a cost against agent 526 which is behind the AV at this tick that we are considering. FIG. 5C illustrates another scenario 530 in which it is possible for the AV 504 to branch around the agent 532 to which the AV is not requested to yield such that the avShouldYield value is 0 meaning that the AV 504 is not requested to yield to the agent 532. However, in this case, the particular branch from the planning stack 118 might indicate a route which takes the AV 504 around the agent 532. In this case, taking into account the yield/assert predictions, if the avShouldYield value is 0, and the route to be taken includes such a branching, then there may or may not be a cost associated with that branch. In scenario 540, the AV 504 should, because to the avShouldYield value is a 1, not assert against the agent 542. In this case, the agent 542 is longitudinally ahead of the AV 504. In this case, a branch which indicates a route which takes the AV around the agent will incur a cost, since the AV should not assert against the agent.

As shown in FIG. 5C, lower diagram 540, when the avShouldYield value is 1 meaning that the AV 504 should not assert against the agent 542, the AV 504 should not risk a collision by asserting against the agent. Another reason the AV 504 shouldn't pass the agent 542 could be because it would be impolite. Because of this scenario in which it might be more challenging or dangerous to pass a longitudinally and laterally nearby agent ahead of the AV 504, the planning stack 118 will add a cost to a branch of the tree that would include this potential route of the AV 504. Because of this, the avShouldYield value should not be 0, which would cause the planning stack to cost branches that go around the agent 542. In some cases, this cost might be weighted relative to other costs or might be the only cost in the branch when the state is available. In either case, the cost of this branch would be increased and its likelihood of being selected as the route for the AV 504 is reduced.

Figure 6:
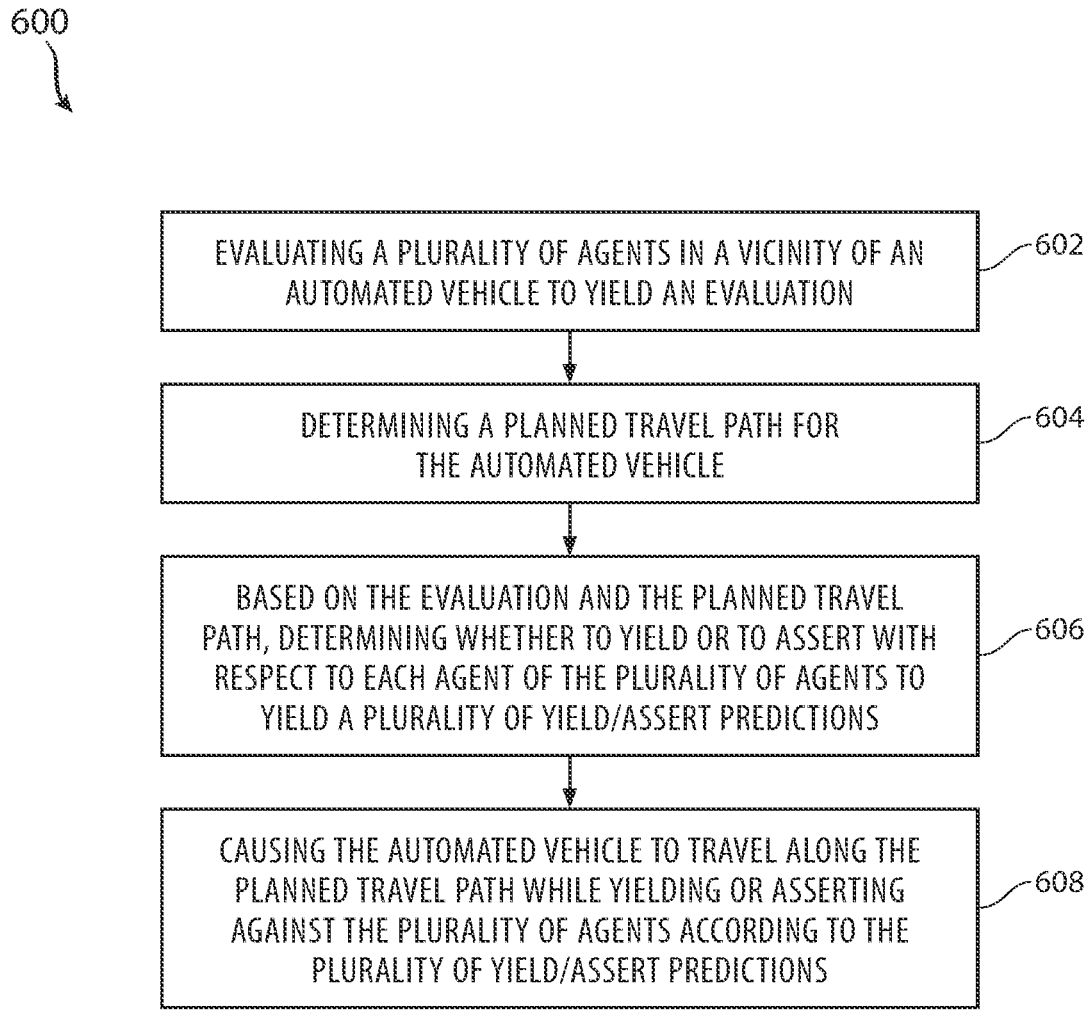
FIG. 6 illustrates a method associated with using a machine learning model.

FIG. 6 illustrates an example method 600 including one or more steps of evaluating a plurality of agents in a vicinity of an autonomous vehicle to yield an evaluation (602), determining a planned travel path for the autonomous vehicle (604), based on the evaluation and the planned travel path, determining whether to yield or to assert with respect to each respective agent of the plurality of agents to yield a plurality of yield/assert predictions (606) and causing the autonomous vehicle to travel along the planned travel path while yielding or asserting against the plurality of agents according to the plurality of yield/assert predictions (608). The process of course can also apply to a single agent as well.

The determining step can be performed via a machine learning model that incorporates a context of a scene including the autonomous vehicle and the plurality of agents. Other models such as neural networks, artificial intelligence models and so forth can be implemented as well.

Each respective agent of the plurality of agents can be one of a vehicle, a person, a bicycle, or a motorcycle. The context or scene associated with the AV can be any object that can impact the route of the AV. The agent may be moving and may also be a flying vehicle as well such as a drone.

The context of the scene can include one or more of a current state of the autonomous vehicle, a traffic light state, a lane state, and a predicted action associated with each respective agent of the plurality of agents. The data for the context of the scene can be provided by sensors on the AV as shown in FIG. 1, or through a cellular, WiFi, or other wireless connection to a network that can provided data about the agents that the AV might encounter or need to yield to are assert against (pass).

The current state of the autonomous vehicle (AV) can include the kinematics and dynamics of the AV, such as, for example, one or more of a position of the AV, an acceleration of the AV, a velocity of the AV, characteristics associated with the AV, a predicted future pose of the AV, and a prediction of future motion of the AV.

Data for the context of the scene can be provided at least in part to the machine learning model via one or more of a raster image, a vector having data of any type, such as a vector of scalars. Other data forms or files can also be used. The type of data that is provided to the machine learning model 202 can be determined based on the type of sensor used to obtain the data. For example, sensors on the AV enable the system to create a map of the scene and perception helps the system to track objects in the scene, all of which can be stored and converted into a raster image. Other image types (JPG, etc.) can also be used for input to the model 404.

The plurality of yield/assert predictions comprises a set of yield/assert predictions in which a respective yield/assert prediction can be included for each respective agent of the plurality of agents. Thus, for a first agent, a first yield/assert prediction can be output. For a second agent, a second yield/assert prediction can be output. The planner stack can use the output data for each respective agent to adjust costs in the branches of possible routes for the AV as outlined below.

A plurality of different types of input related to the context of the scene can be provided as input to the machine learning model. An output of the machine learning model can include the plurality of yield/assert predictions.

In another aspect, causing the autonomous vehicle to travel along the planned travel path while yielding or asserting against the plurality of agents according to the plurality of yield/assert predictions further can include implementing, in each potential branch associated with a respective possible travel path of the autonomous vehicle being evaluated by a planner module, a respective cost relative to the each respective prediction of the plurality of yield/assert predictions for each respective agent of the plurality of agents. The various cost determinations are shown by way of example in FIGS. 5A-5C.

Implementing the respective cost can further can include, for each potential branch of the respective possible travel path of the autonomous vehicle, one or more of: adding no cost for a far head agent in front of the autonomous vehicle that the AV does not plan to overtake, adding no cost for an agent behind the autonomous vehicle, adding no cost for a laterally distant agent, adding no cost for an agent which the autonomous vehicle should assert over, adding no cost for the autonomous vehicle to branch around an agent to which the autonomous vehicle is not requested to yield, and adding a cost to pass a longitudinally and laterally nearby agent ahead of the autonomous vehicle.

An example system includes a processor and a computer-readable storage device storing instructions which, when executed by the processor, cause the processor to perform operations including evaluating a plurality of agents in a vicinity of an autonomous vehicle to yield an evaluation, determining a planned travel path for the autonomous vehicle, based on the evaluation and the planned travel path, determining whether to yield or to assert with respect to each respective agent of the plurality of agents to yield a plurality of yield/assert predictions and causing the autonomous vehicle to travel along the planned travel path while yielding or asserting against the plurality of agents according to the plurality of yield/assert predictions.

Causing the autonomous vehicle to travel along the planned travel path while yielding or asserting against the plurality of agents according to the plurality of yield/assert predictions further can include implementing, in each potential branch associated with a respective possible travel path of the autonomous vehicle being evaluated by a planner module, a respective cost relative to the each respective prediction of the plurality of yield/assert predictions for each respective agent of the plurality of agents.

In another aspect, the determining operation can be performed via a machine learning model that incorporates a context of a scene comprising the autonomous vehicle and the plurality of agents. The plurality of yield/assert predictions can include a set of yield/assert predictions in which a respective yield/assert prediction is included for each respective agent of the plurality of agents. A plurality of different types of input related to the context of the scene can be provided as input to the machine learning model, and wherein an output of the machine learning model comprises the plurality of yield/assert predictions.

Figure 7:
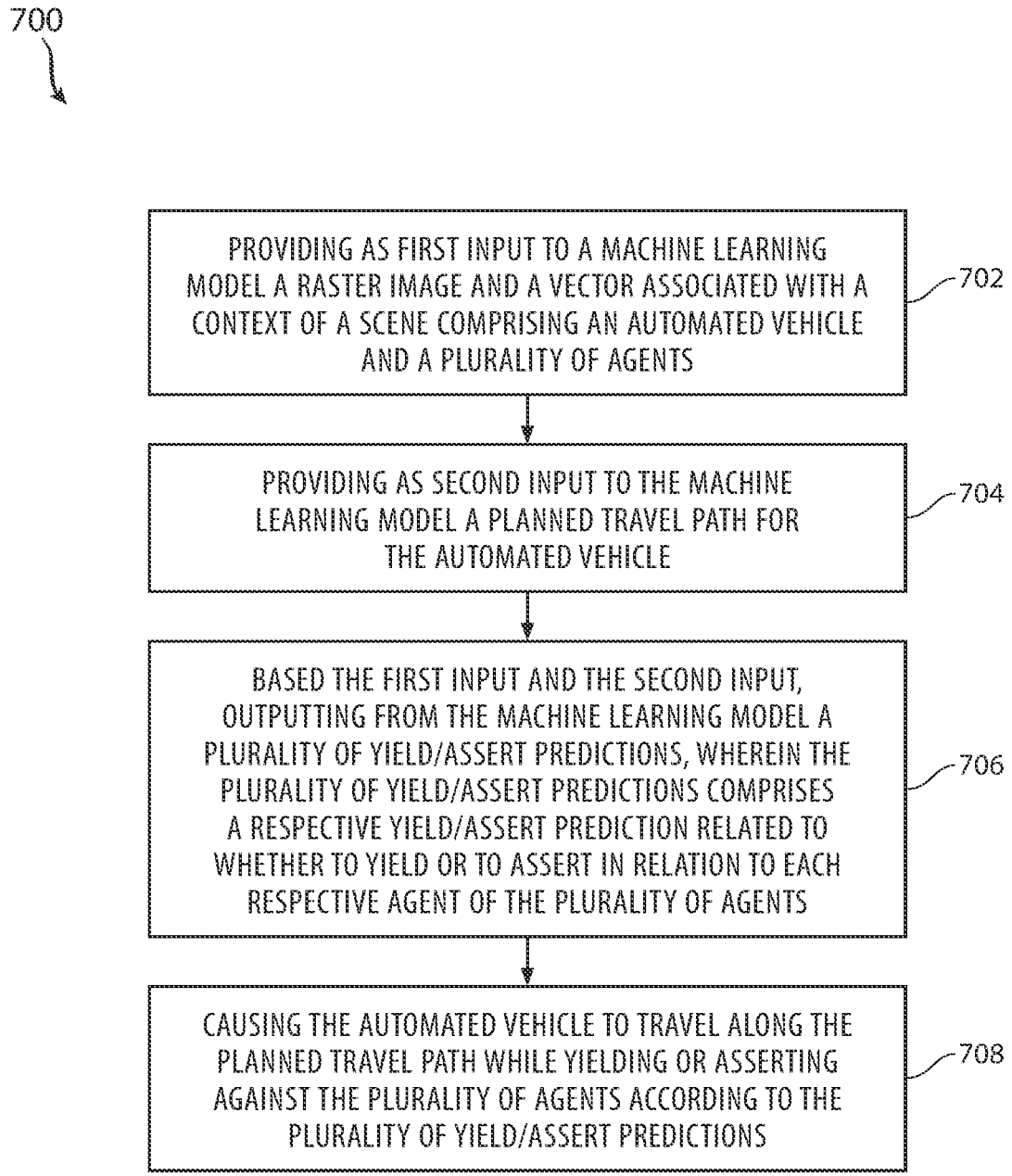
FIG. 7 illustrates using the machine learning model to plan routes for the AV.

FIG. 7 illustrates an example method 700 that can include one or more of providing as first input to a machine learning model a raster image and/or a vector associated with a context of a scene comprising an autonomous vehicle and a plurality of agents (702), providing as second input to the machine learning model a planned travel path for the autonomous vehicle (704), based the first input and the second input, outputting from the machine learning model a plurality of yield/assert predictions, wherein the plurality of yield/assert predictions comprises a respective yield/assert prediction related to whether to yield or to assert in relation to each respective agent of the plurality of agents (706) and causing the autonomous vehicle to travel along the planned travel path while yielding or asserting against the plurality of agents according to the plurality of yield/assert predictions (708). The data input to the model may be of the same type (all raster data) or data of different types (some raster data, some vector data).

Autolabeler Module

Figure 8:
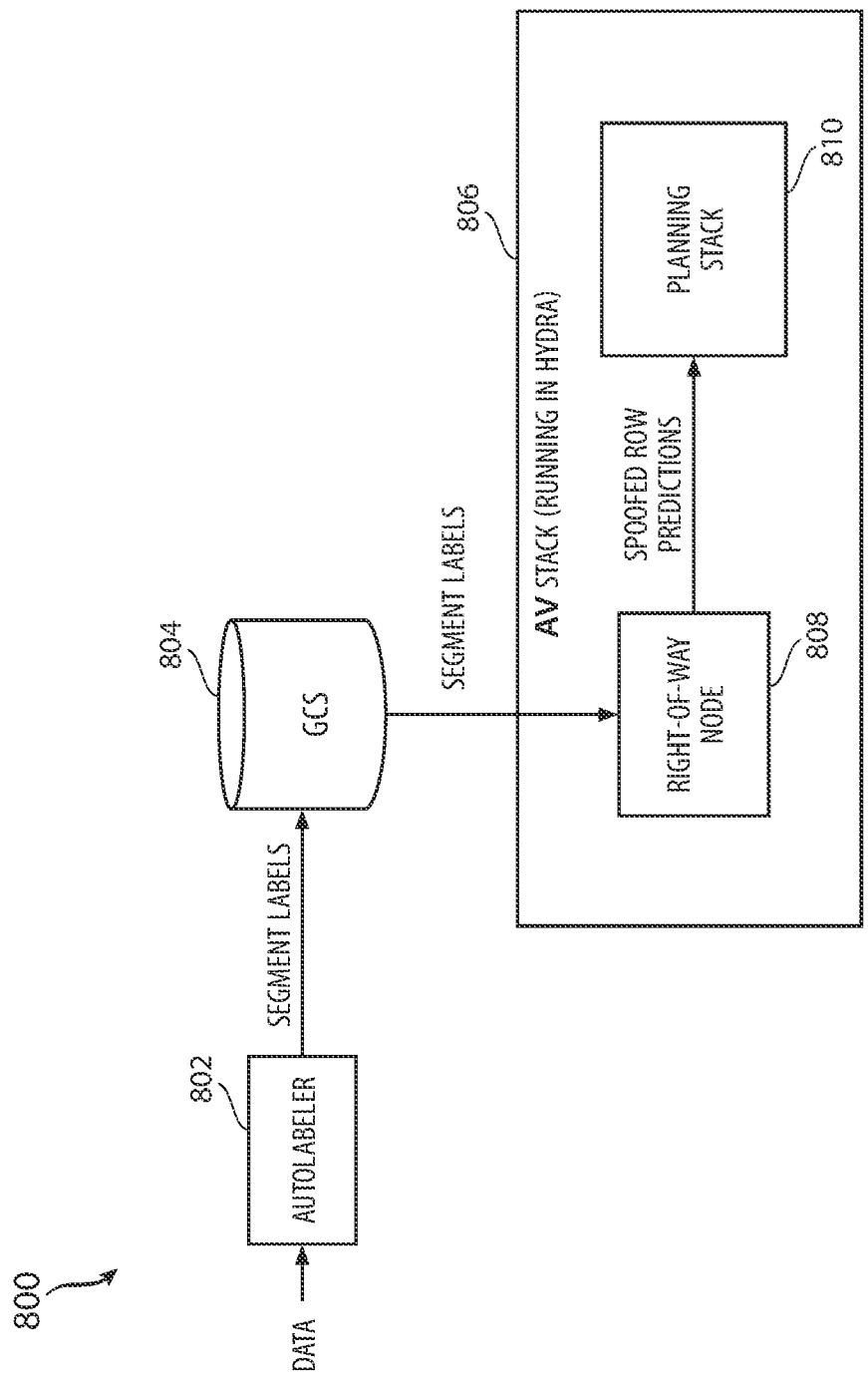
FIG. 8 illustrates the use of the autolabeler module.

FIG. 8 illustrates an example system 800 which includes an autolabeler module 802 that receives data associated with autonomous vehicle movements particularly with respect to right-of-way decisions. The autolabeler module 802 produces segment-based labels when the on-road tracking of data is done on a segment by segment basis. A segment can be a period of time like 30 seconds or it might be a distance traveled (like 1 or 3 miles).

The autolabeler module 802 can be configured on an autonomous vehicle or might be configured on a network-based server that receives data from the autonomous vehicle. The autolabeler module 802 will receive on-road data from one or more autonomous vehicles that are being tested. In one aspect, the data can be gathered in segments which can be segments of time such as ten or twenty seconds or any other period of time. In each segment of data, the system knows where the autonomous vehicle is as well as other associated agents for each tick. A tick in one example can be a short step at a time such as one second or a half second.

The autolabeler module 802 can run on the data which can be on a segment by segment basis. In one aspect, the autolabeler module 802 will look into the future relative to each tick in a segment and evaluate what the outcome is based on the on-road actual data. Then, the autolabeler module 802 will run, according to the right-of-way framework with respect to the various types of possible labels, and calculate a value for each respective label for each tick. Thus, for example, the autolabeler module 802, for a period of one second within a segment of data, assign a value of "0.8" to an assert label and a value of "0.2" for a yield label because the outcome of a right-of-way decision of the autonomous vehicle was to speed up and move ahead of an agent or other vehicle as part of a merger process.

In one example, the values for the labels can run between zero for a zero prediction of the assert/yield happening and a 1 meaning a 100% prediction that the event will happen. The autolabeler module 802 can take into account the agent/AV poses in a prediction policy distribution and also utilize data from signals or lights that are within the vicinity of the AV and can impact the expectation or intent of the AV or other agents. The analysis can also take into account other road data or lane features including a traffic light state. This type of data can be provided to generate a tick-level label.

A labeling algorithm operating in the autolabeler module 802 can utilize other information such as the longitudinal distance between the AV and the agent positions at a given tick in a segment when projected onto an AV travel polyline. The agent or NPC travel polyline can also be taken into account. A signed longitudinal distance (sld) can be the difference between the AV positions along a travel polyline and the NPC positions along the travel polyline. The system can evaluate whether the agent is in the AV's plan based on the future travel region of the AV, with the travel region defined using the AV's future on-road footprints over a long time period ahead of the current tick.

One example labeling algorithm can include:

```
For t in time:
    For npc in npcs:
        if InAvPlan(npc[t+FUTURE]) and Sld(npc[t+FUTURE]) < 0:
            okToOvertake[npc.track_id][t] = 0
        else:
            okToOvertake[npc.track_id][t] = 1
            BackPropagateAVStopped(okToOvertake[npc.track_id][t])
```

The algorithm above determines, based on the future data of the movement of the AV and NPC relative to a particular tick, when it is appropriate for the AV to overtake an NPC and to then assign a value to the appropriate label.

Data that is used for generating the labels can take a variety of forms. For example, data can be gathered regarding which is a lead car in a scene or in a context in which the AV is to interact with other agents. Data regarding whether the AV is a lead car and whether the AV overtakes another vehicle can be used. The system can obtain data regarding whether a vehicle agent overtakes the AV from behind or whether another vehicle overtakes the AV of a parking lot for a driveway. Data can include whether the AV overtakes a pedestrian or whether the pedestrian is at an intersection. Other data can include whether the pedestrian is jaywalking. The data can include whether the AV overtakes a bike or whether a vehicle is an adjacent agent or an adjacent bike. A cross traffic bike can produce a certain type of data and a lead bike can produce a different type of data. If a vehicle is stopped at a traffic light or not can also be relevant with respect to a right-of-way decision. Any or all of this data can be utilized by the autolabeler module 802 in order to assign values on a tick-level to labels.

FIG. 8 shows the segment labels be provided to a Google Cloud Storage (GCS) 804 which can perform further operations on the data such as storing the data as well as transmitting the segment labels to an AV stack 806. Any cloud storage service can be applicable. The AV stack 806 can relate to the various stacks shown on the local computing device 110 in FIG. 1. FIG. 8 shows two uses of the segment labels. One can be to provide segment labels to a right-of-way node 808. In one aspect, this can represent a training process of the machine learning model in which the model operating on the right-of-way node 808 can be trained using the on-road data used to generate segment labels. In another aspect, the segment labels can be provided to a planning stack 810 which can correspond to the planning stack 118 in FIG. 1. The planning stack 810 can be spoofed by the right-of-way predictions, which process enables the system to validate the segment labels and to determine whether they have a positive impact on the behavior of the AV based on the output of the planning stack 810. Spoofing is discussed more fully below.

Figure 9A:
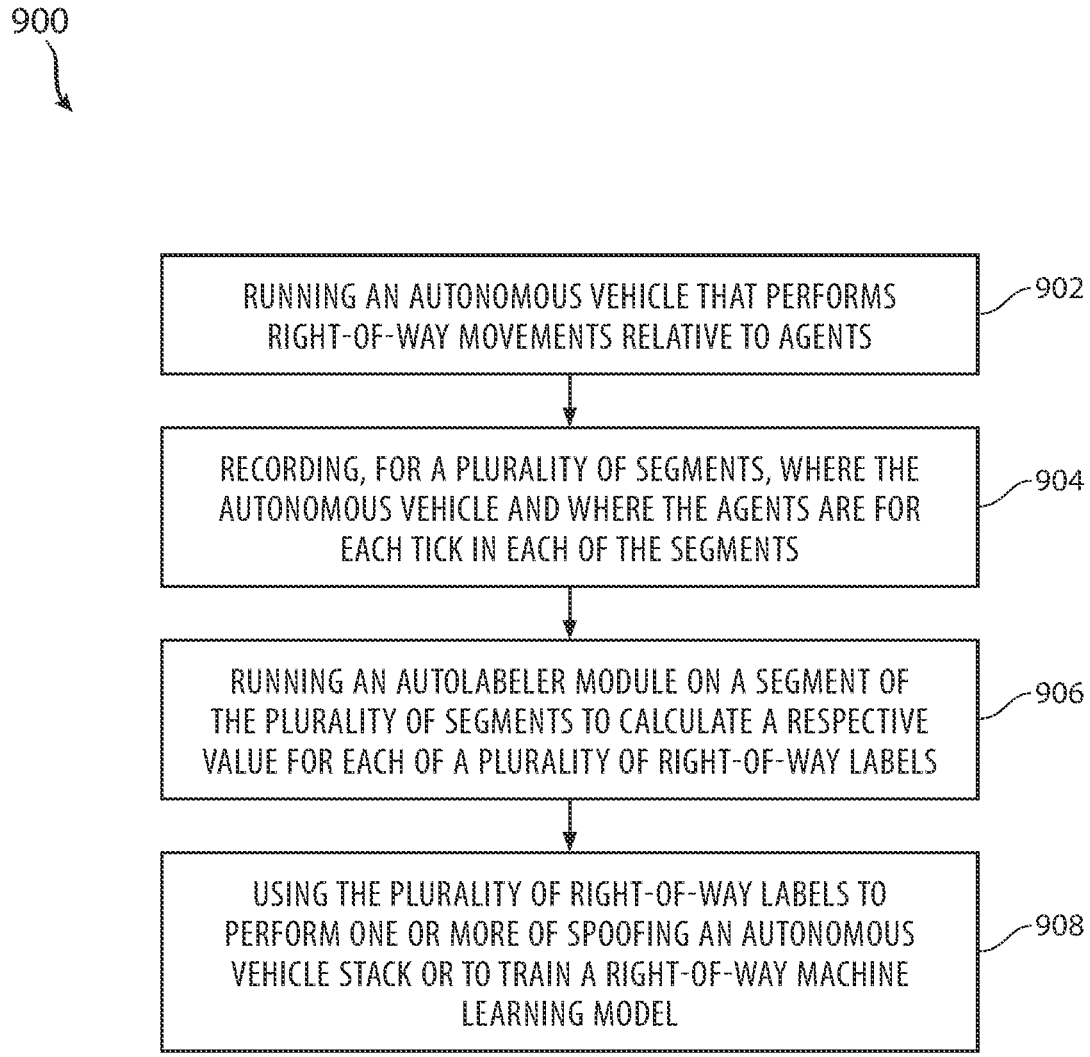
FIG. 9A illustrates an example method related to using the autolabeler.

FIG. 9A illustrates an example method of generating values for right-of-way labels using an autolabeler module 802. The method 900 includes running an autonomous vehicle that performs right-of-way movements relative to agents (902), recording, for a plurality of segments of time or distance, where the autonomous vehicle and where the agents are for each tick in each of the segments (904), running an autolabeler module on a segment of the plurality of segments to calculate a respective value for each of a plurality of right-of-way labels (906) and using the plurality of right-of-way labels to perform one or more of spoofing an autonomous vehicle stack or to train a right-of-way machine learning model (908). The autolabeler can calculate the respective value for a plurality of right-of-way labels on a per tick basis. This can mean per snippet of time in a segment, the value of the label is generated.

Running an autolabeler module on the segment of time or distance of the plurality of segments to calculate the respective value for each of the plurality of right-of-way labels further can include looking, via the autolabeler, into the future for an outcome of positions for the autonomous vehicle relative to a respective agent. In other words, for a snippet of time or a tick, the system can look to see what happened after that tick in the recorded history of the movements of the AV relative to neighboring or other agents around the AV. A separate label can be valued for each AV/agent pair.

Looking, via the autolabeler, into the future for an outcome of positions for the autonomous vehicle relative to a respective agent can be performed on a per tick basis in the segment. The right-of-way movements relative to the agents can be performed one of autonomously via the AV or via human intervention. A human driver can correct actions of the AV with respect to the right-of-way movements. In another aspect, the human driver might just take over when a right-of-way decision is to be made, make the proper right-of-way movement happen, and then let the AV take over again after that. The system records all of these movements and performs the valuation of the various labels accordingly.

Figure 9B:
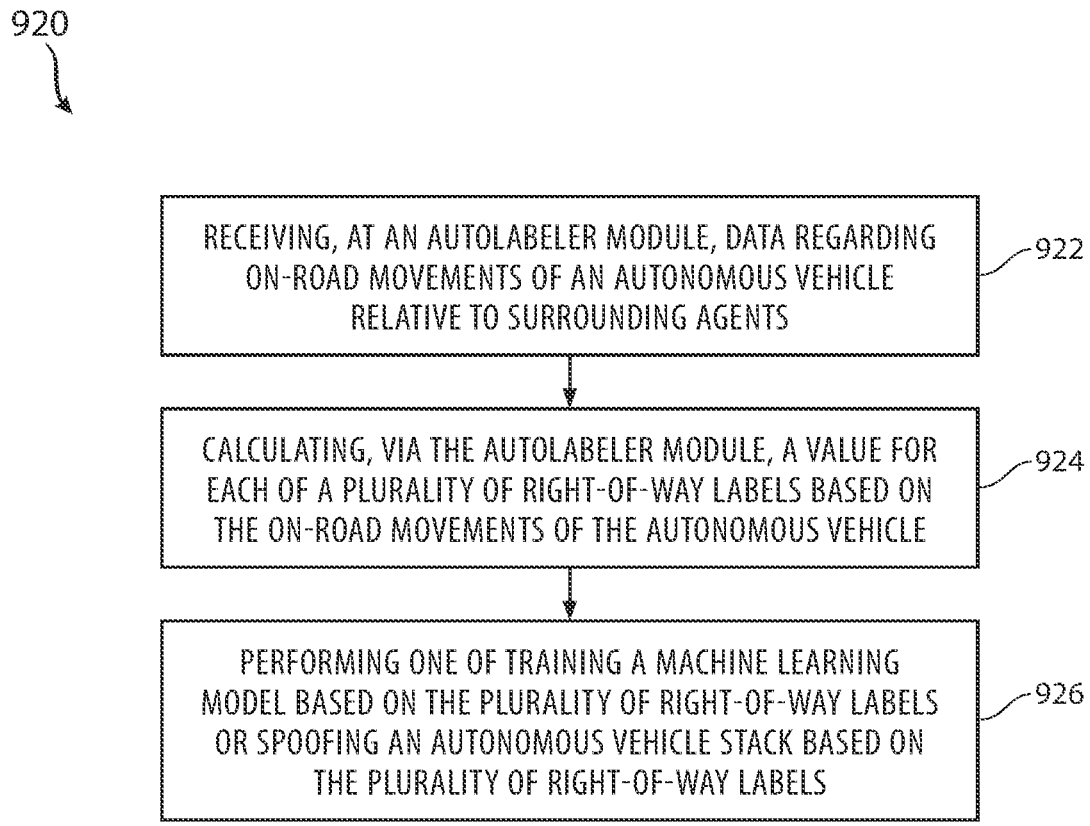
FIG. 9B illustrates another example method related to using the autolabeler.

FIG. 9B illustrates another example method 920 related to use of the autolabeler 802. The method 920 includes receiving, at an autolabeler module, data regarding on-road movements of an autonomous vehicle relative to surrounding agents (922), calculating, via the autolabeler module, a value for each of a plurality of right-of-way labels based on the on-road movements of the autonomous vehicle (924) and performing one of training a machine learning model based on the plurality of right-of-way labels or spoofing an autonomous vehicle stack based on the plurality of right-of-way labels (926). The data can relate to segments and be processed on a tick by tick basis. The data regarding on-road movements relates to one of autonomous decisions regarding the movements of the autonomous vehicle relative to the surrounding agents and human intervention decisions regarding the movements of the autonomous vehicle relative to the surrounding agents.

In one aspect the structure of notion of the labels is also novel. The plurality of right-of-way labels can relate to one or more of yield/assert, overtake/don't overtake and encroach/don't encroach. Other structures with more detail with respect to the labels can also be provided.

A system related to the autolabeler module can include a processor and a computer-readable storage medium storing instructions which, when executed by the processor, cause the processor to perform operations including receiving data regarding on-road movements of an autonomous vehicle relative to surrounding agents, calculating a value for each of a plurality of right-of-way labels based on the on-road movements of the autonomous vehicle and performing one of training a machine learning model based on the plurality of right-of-way labels or spoofing an autonomous vehicle stack based on the plurality of right-of-way labels.

Spoofing the Planning Stack

Figure 10:
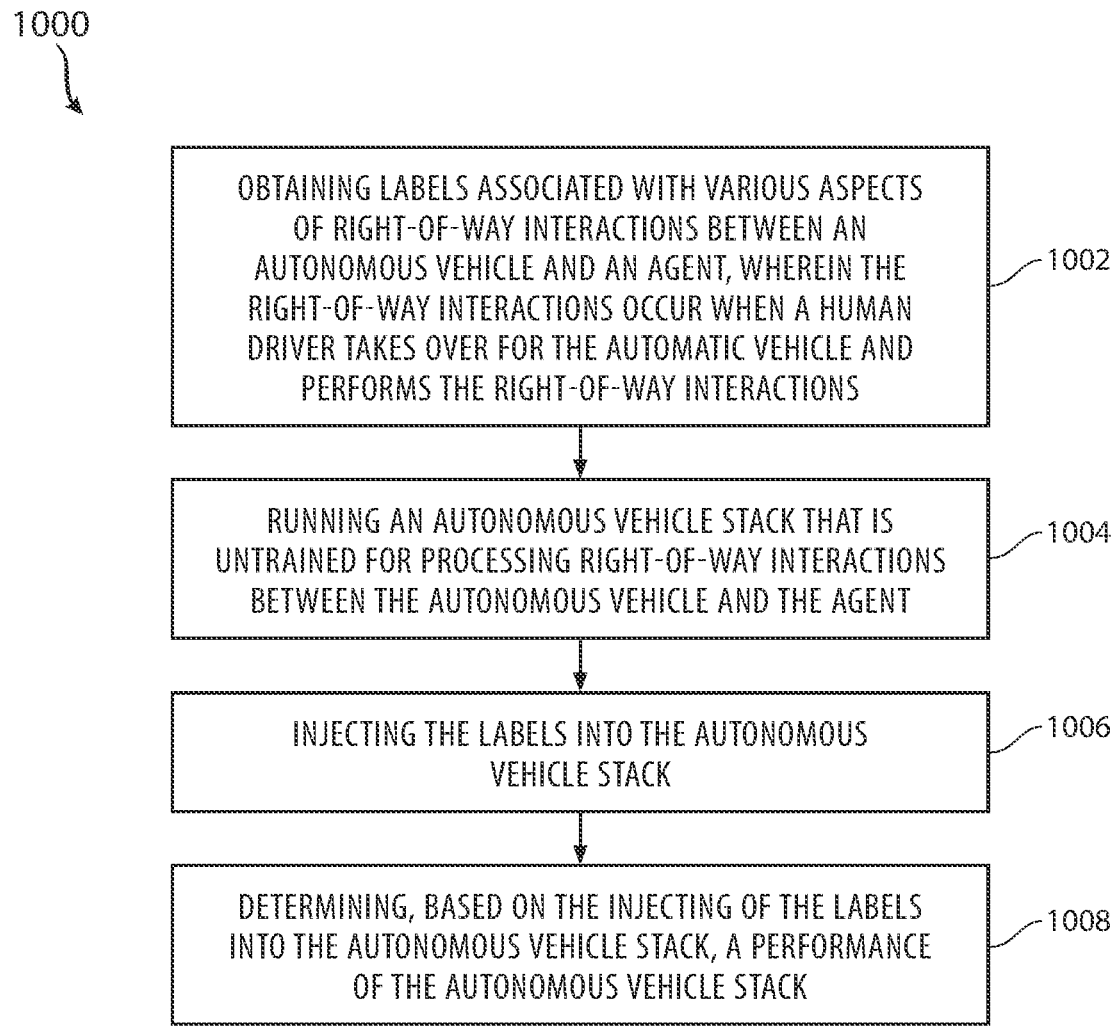
FIG. 10 illustrates an example spoofing method using segment labels from the autolabeler.

FIG. 10 illustrates an example spoofing method 1000. This spoofing process is related to using the segment labels generated by the autolabeler module 802 for the purpose of validating whether the way the labels are structured makes a positive impact on the behavior of the AV. In this case, the system runs the AV stack and the segment labels are injected into the AV stack to see if they have a positive impact on the behavior of the AV. In this case, it is known that the segment labels have come from the autolabeler module 802 and are therefore accurate because they are based on the on-road actual experience. In other words, these are not labels that were approximated by a machine learning model. By providing "perfect" predictions to the AV stack 806 and more specifically to the planning stack 810 of the AV stack, the performance of the AV stack 806 can provide an upper bound of the potential positive impact that can come when the label framework is provided as training data to the machine learning model which can be implemented in the right-of-way node 808.

The method 1000 can include one or more of obtaining labels associated with various aspects of right-of-way interactions between an autonomous vehicle and an agent, wherein the right-of-way interactions occur when a human driver takes over for the autonomous vehicle and performs the right-of-way interactions (1002), running an autonomous vehicle stack that is untrained for processing right-of-way interactions between the autonomous vehicle and the agent (1004), injecting the labels into the autonomous vehicle stack (1006) and determining, based on the injecting of the labels into the autonomous vehicle stack, a performance of the autonomous vehicle stack (1008). The labels can include at least a first label associated with asserting against the agent and a second label associated with yielding to the agent. The labels further can include a plurality of labels associated with different types of agents, such as pedestrians, vehicles, bikes, motorcycles, drones, and so forth. The agents can further include stop-lights, buildings and plants.

The step of determining, based on the injecting of the labels into the autonomous vehicle stack, the performance of the autonomous vehicle stack without training a machine learning model on the labels further can include determining an upper bound on a positive impact that can be obtained from the autonomous vehicle stack given a current formulation of the labels. Further, the step of determining, based on the injecting of the labels into the autonomous vehicle stack, the performance of the autonomous vehicle stack can include adjusting a path of the autonomous vehicle based on an outcome of the autonomous vehicle stack. Based on the performance of the autonomous vehicle stack, the system such as the autolabeler 802 can adjust a formulation of the labels to yield new labels. The method then can further include injecting the new labels into the autonomous vehicle stack and determining, based on the injecting of the new labels into the autonomous vehicle stack, a second performance of the autonomous vehicle stack.

The formulation of the labels can be used to both summarize the right-of-way space and the formulation can make the label amenable to be auto-labeled by the autolabeler module 802 described herein. Thus, for example, the formulation of the labels makes it possible to use the automated outcome of the autolabeler 802 to calculate the mean values for each label at each tick in a segment and thus reduces the need to have humans in the loop to label the data.

The labels can include one or more of overtake/don't overtake, encroach/don't encroach and yield/assert. Other structures regarding the labels can also be provided such that different labels can be used for pedestrians, pedestrians in cross walks or jaywalking, bikes, motorcycles, and vehicles including flying vehicles like drones. Labels can be tailored to specific types of vehicles too such as buses, small cars, trucks, sports cars, convertibles, and so forth as the behavior of these vehicles and the capabilities of these vehicles differ. For example, a sports car or a Tesla will start from a stopped position differently than a bus due to varying kinematics. Thus, the yield/assert labels will likely be different depending on the vehicle type.

An example system can include an autonomous vehicle that drives at least in part without human intervention, an automatic labeler that receives data regarding right-of-way decisions made by a human driver correcting decisions made by the autonomous vehicle and outputs right-of-way labels and a planning stack associated with deciding how to navigate the autonomous vehicle, wherein the right-of-way labels are injected into the planning stack to generate a planning stack output based on the right-of-way labels. The planning stack output can cause the autonomous vehicle to take an action related to a right-of-way decision with respect to one or more agents. The right-of-way labels can be generated in one example by the automatic labeler and not a machine learning model. This can be done offline for spoofing purposes and not on-road.

The system can further include a machine learning model trained on the right-of-way labels. The system can further include an autonomous vehicle stack that incorporates the machine learning model for making right-of-way predictions. The right-of-way labels can include one or more of overtake/don't overtake, encroach/don't encroach and yield/assert. Other label structures such as being specific to a vehicle type or agent type can also be used.

In one aspect, the overtake/don't overtake label relates to a comparison of a projection of agent polygon points of an agent onto an intended path of the autonomous vehicle and if a final pose of the autonomous vehicle is ahead of the agent, then the label is overtake and if the final pose of the autonomous vehicle is not ahead of the agent, then the label is don't overtake.

There can be different mathematical notions of right-of-way. For example, the overtake concept is mathematically defined as the AV ahead or behind the NPC by using the projection of the NPC polygon points onto the intended travel path as defined also by polygon points of the AV. The system can take the boundary points of the NPC polygon, and project them onto the AV's intended travel path. If the final pose (position, orientation, etc.) of the AV ends up ahead of the points or the boundary points of the NPC polygon, then it has "overtaken" the NPC. In that case, it is considered to have "asserted" on the NPC. If the AV stays behind the NPC, it has not asserted on the NPC, but yielded. The overtake notion can be described mathematically based on whether the AV's intended travel path, when represented as a concatenated sequence of polygons, intersects with the intended travel path of the NPC, also represented as a concatenated sequence of polygons.

Basically the yield/assert notion is to evaluate whether the AV is allowed to be in front of or stay behind the NPC. In another aspect, data related to oncoming traffic, cross traffic, rear traffic, merging traffic or that is in a different lane than the AV can all be taken into account with respect to an intended path as defined by a sequence of polygons. Furthermore, determinations of whether a vehicle is a "lead" vehicle or whether the agent relates to a pedestrian in or out of a crosswalk or a stopped vehicle can all be considered by an autolabeler module 802 in assigning values to right-of-way labels.

Figure 11:
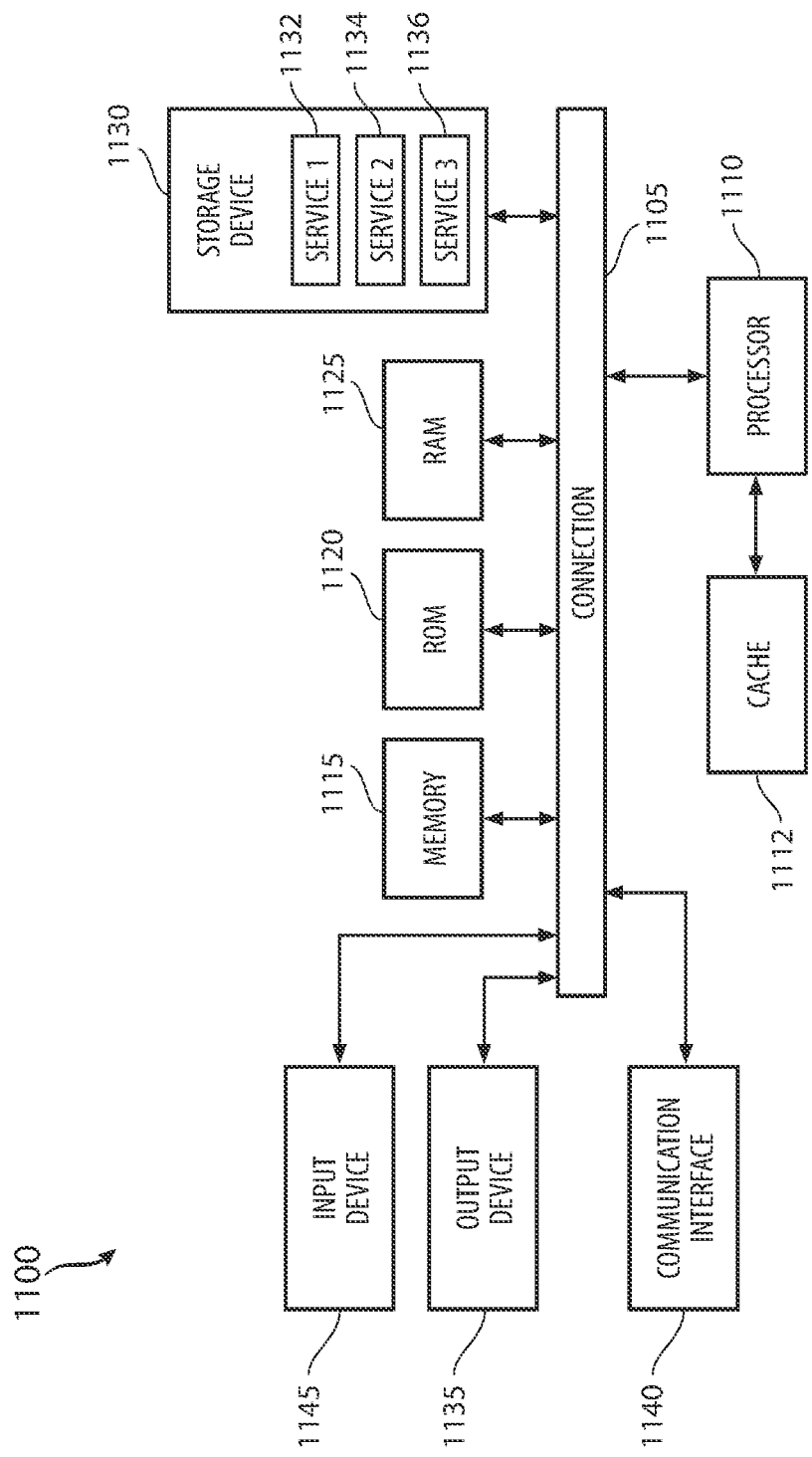
FIG. 11 illustrates a computing device which can be used in the various examples disclosed herein.

FIG. 11 illustrates an architecture of an example computing device 1100 which can implement the various techniques described herein. For example, the computing device 1100 can implement the autolabeler module 802 shown in FIG. 8. The components of the computing device 1100 are shown in electrical communication with each other using a connection 1105, such as a bus. The example computing device 1100 includes a processing unit (CPU or processor) 1110 and a computing device connection 1105 that couples various computing device components including the computing device memory 1115, such as read-only memory (ROM) 1120 and random access memory (RAM) 1125, to the processor 1110. The computing device 1100 can include a cache of high-speed memory connected directly with, in close proximity to, or integrated as part of the processor 1110. The computing device 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions.

Other computing device memory 1115 may be available for use as well. The memory 1115 can include multiple different types of memory with different performance characteristics. The processor 1110 can include any general purpose processor and hardware or software service, such as service 1 1132, service 2 1134, and service 3 1136 stored in storage device 1130, configured to control the processor 1110 as well as a special-purpose processor where software instructions are incorporated into the processor design. The processor 1110 may be a self-contained system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art, such as a display, projector, television, speaker device, etc. In some instances, multimodal computing devices can enable a user to provide multiple types of input to communicate with the computing device 1100. The communications interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include services 1132, 1134, 1136 for controlling the processor 1110. Other hardware or software modules are contemplated. The storage device 1130 can be connected to the computing device connection 1105. In one aspect, a hardware module that performs a particular function can include the software component stored in a computer-readable medium in connection with the necessary hardware components, such as the processor 1110, connection 1105, output device 1135, and so forth, to carry out the function.

For clarity of explanation, in some instances, the present technology may be presented as including individual functional blocks including functional blocks comprising devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods, according to the above-described examples, can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components, computing devices and methods within the scope of the appended claims.

Claim language reciting "at least one of" a set indicates that one member of the set or multiple members of the set satisfy the claim. For example, claim language reciting "at least one of A and B" means A, B, or A and B.

We claim:

1. A method comprising:
    obtaining labels associated with various aspects of right-of-way interactions between an autonomous vehicle and an agent, wherein the right-of-way interactions occur when a human driver takes over for the autonomous vehicle and performs the right-of-way interactions;
    running an autonomous vehicle stack that is untrained for processing right-of-way interactions between the autonomous vehicle and the agent;
    injecting the labels into the autonomous vehicle stack; and
    determining, based on the injecting of the labels into the autonomous vehicle stack, a performance of the autonomous vehicle stack.

2. The method of claim 1, wherein the labels comprise at least a first label associated with asserting against the agent and a second label associated with yielding to the agent.

3. The method of claim 1, wherein the labels further comprise a plurality of labels associated with different types of agents.

4. The method of claim 3, wherein the agents comprise at least one of more of vehicles, bicycles, motorcycles, pedestrians, stop-lights, buildings and plants.

5. The method of claim 1, wherein determining, based on the injecting of the labels into the autonomous vehicle stack, the performance of the autonomous vehicle stack without training a machine learning model on the labels further comprises determining an upper bound on a positive impact that can be obtained from the autonomous vehicle stack given a current formulation of the labels.

6. The method of claim 1, wherein determining, based on the injecting of the labels into the autonomous vehicle stack, the performance of the autonomous vehicle stack further comprises adjusting a path of the autonomous vehicle based on an outcome of the autonomous vehicle stack.

7. The method of claim 1, wherein the autonomous vehicle stack comprises a planning stack.

8. The method of claim 1, further comprising:
based on the performance of the autonomous vehicle stack, adjusting a formulation of the labels to yield new labels.

9. The method of claim 8, further comprising:
injecting the new labels into the autonomous vehicle stack; and
determining, based on the injecting of the new labels into the autonomous vehicle stack, a second performance of the autonomous vehicle stack.

10. The method of claim 1, wherein the labels are associated with ticks within segments of data gathered by the autonomous vehicle.

11. The method of claim 1, wherein the labels comprise one or more of overtake/don't overtake, encroach/don't encroach and yield/assert.

12. A system comprising:
an autonomous vehicle that drives at least in part without human intervention;
an automatic labeler that receives data regarding right-of-way decisions made by a human driver correcting decisions made by the autonomous vehicle and outputs right-of-way labels; and
a planning stack associated with deciding how to navigate the autonomous vehicle, wherein the right-of-way labels are injected into the planning stack to generate a planning stack output based on the right-of-way labels.

13. The system of claim 12, wherein the planning stack output causes the autonomous vehicle to take an action related to a right-of-way decision with respect to one or more agents.

14. The system of claim 12, wherein the right-of-way labels are generated by the automatic labeler and not a machine learning model.

15. The system of claim 12, further comprising:
a machine learning model trained on the right-of-way labels.

16. The system of claim 15, further comprising:
an autonomous vehicle stack that incorporates the machine learning model for making right-of-way predictions.

17. The system of claim 12, wherein the right-of-way labels comprise one or more of overtake/don't overtake, encroach/don't encroach and yield/assert.

18. The system of claim 12, wherein each right-of-way label of the right-of-way labels relates to an interaction between the autonomous vehicle and an agent.

19. The system of claim 17, wherein a overtake/don't overtake label relates to a comparison of a projection of agent polygon points of an agent onto an intended path of the autonomous vehicle and if a final pose of the autonomous vehicle is ahead of the agent, then the label is overtake and if the final pose of the autonomous vehicle is not ahead of the agent, then the label is don't overtake.

\* \* \* \* \*